United States Patent [19]
Nelson

[11] Patent Number: 5,974,873
[45] Date of Patent: Nov. 2, 1999

[54] DRUG RESERVOIR VOLUME MEASURING DEVICE

[75] Inventor: Timothy S. Nelson, Mont sur Rolle, Switzerland

[73] Assignee: Medtronic, Inc., Minneapolis, Minn.

[21] Appl. No.: 09/031,990

[22] Filed: Feb. 27, 1998

[51] Int. Cl.$^6$ .................................................. G01F 17/00
[52] U.S. Cl. ............................................................ 73/149
[58] Field of Search .............................. 73/149, 862.541, 73/862.632, 862.635, 862.627, 786

[56] References Cited

U.S. PATENT DOCUMENTS

| | | |
|---|---|---|
| 2,549,049 | 4/1951 | Bierman . |
| 4,213,348 | 7/1980 | Reinertson et al. . |
| 4,475,409 | 10/1984 | Zulliger ................................ 73/862.627 |
| 4,777,497 | 10/1988 | Nozu et al. . |
| 4,986,113 | 1/1991 | Harrison et al. . |
| 5,259,673 | 11/1993 | Christopher . |
| 5,493,903 | 2/1996 | Allen .......................................... 73/149 |
| 5,665,910 | 9/1997 | Knutson et al. ....................... 73/149 X |

FOREIGN PATENT DOCUMENTS

| | | | |
|---|---|---|---|
| 0118443 | 5/1991 | Japan ............................ G01N 17/00 |
| 118443 | 5/1991 | Japan . | |
| 1062-530 | 12/1983 | U.S.S.R. .......................... G01F 17/00 |
| 1062530 | 12/1983 | U.S.S.R. . | |

*Primary Examiner*—Benjamin R. Fuller
*Assistant Examiner*—Jewel V. Thompson
*Attorney, Agent, or Firm*—Harold R. Patton; Curtis D. Kinghorn

[57] ABSTRACT

An apparatus and method is disclosed for determining the amount of drug remaining in a bellows type or bladder type drug reservoir. With a bellows type drug reservoir, a strain gauge is connected to one end of the bellows and to the bulk head to which the bellows reservoir is attached. With a bladder type drug reservoir, a strain gauge is connected at one end to an end plate attached to the bladder and at the other end to a bulk head. In a variant of these embodiment, the strain gauge is attached at one end to either the bellows or end plate and at the other end to an anchor point that has a fixed distance from the bulk head. In a further embodiment with a bladder type drug reservoir, the reservoir is constrained between a bulk head and an immovable end plate. A strain gauge is attached at one end to a point on the reservoir that moves in response to the filling or depletion of drug from the reservoir. The other end of the strain gauge is attached to an immovable point.

21 Claims, 6 Drawing Sheets

DRUG RESERVOIR VOLUME MEASURING DEVICE

BACKGROUND OF THE INVENTION

1. Field of the Invention

This invention relates generally to implantable drug infusion pumps and more specifically to means on such pumps for measuring the amount of drug remaining in the reservoir of such pumps.

2. Description of the Related Art

Implantable devices such as drug pumps are frequently used to deliver drugs or other liquid medications over long periods of time to selected locations in the human body. These devices commonly include a drug reservoir, catheter means connected to the reservoir to transport the drug and a pumping mechanism to propel the drug in some metered or constant flow dosage to the desired location.

Often the drug reservoir is a bellows shaped reservoir such as is shown in FIGS. 1 and 2. In a bellows reservoir, as the drug leaves the reservoir, the bellows collapses making the volume contained within the reservoir diminish. An example of a drug pump using a bellows-type reservoir as the drug reservoir is the Synchromed® pump sold by Medtronic, Inc. of Minneapolis, Minn.

In FIGS. 1 and 2, the bellows type reservoir is generally referred to as 2. Reservoir 2 is attached at one end to a bulk head 4. Reservoir 2 has an end plate 6 opposite bulk head 4. A series of pleats 8 connect end plate 6 to bulk head 4 and define a space 10 for containing the drug or other fluid to be contained within the reservoir 2. Bulk head 4 contains an opening 12 through which the drug to be stored within reservoir 2 can either enter or leave space 10. Bulk head 4 may have an additional opening 12A so that drug or other fluid may enter reservoir 2 through opening 12 and leave reservoir 2 through opening 12A.

In an alternate embodiment, shown in FIGS. 3 and 4, a bladder type drug reservoir 2' is attached to a bulk head 4. Bulk head 4 preferably contains openings 12 and 12A through which the drug to be stored within reservoir 2' can either enter or leave space 10'. As drug is added to reservoir 2', a point A on the outer surface of reservoir 2' opposite bulk head 4 moves away from bulk head 4. Conversely, as drug is removed from reservoir 2', point A moves closer to bulk head 4.

It is often desirable for physicians to know exactly how much drug remains in an infusion drug pump reservoir when a patient returns for a refill. To date, electronics on the pump containing the reservoir have estimated the amount of drug in the remaining reservoir based on how much drug should theoretically have been removed from the reservoir by the pumping or metering mechanism of the pump. This amount is then subtracted from the amount of the drug originally inserted into the reservoir to arrive at the amount remaining in the reservoir. The physician then confirms the amount delivered to the patient by removing the old drug from the reservoir by syringe and then subtracting the amount removed from the volume originally injected into the pump. This method has the disadvantage that it is cumbersome, a nuisance and results in the waste of the remaining drug withdrawn from the reservoir. This is a problem in need of a solution.

SUMMARY OF THE INVENTION

An apparatus and method is disclosed for determining the amount of drug remaining in a bellows type or bladder type drug reservoir. With a bellows type drug reservoir, a strain gauge is connected to one end of the bellows and to the bulk head to which the bellows reservoir is attached. With a bladder type drug reservoir, a strain gauge is connected at one end to an end plate attached to the bladder and at the other end to a bulk head. In a variant of these embodiment, the strain gauge is attached at one end to either the bellows or end plate and at the other end to an anchor point that has a fixed distance from the bulk head.

In a further embodiment with a bladder type drug reservoir, the reservoir is constrained between a bulk head and an immovable end plate. As the reservoir expands as drug or other medicament is added to the reservoir, the reservoir expands into the space between the bulk head and the end plate. A strain gauge is attached at one end to a point on the reservoir that moves in response to the filling or depletion of drug from the reservoir. The other end of the strain gauge is attached to an immovable point.

In any embodiment, as the reservoir changes in volume due to either a drug being added to or taken from the reservoir, the strain on the strain-gauge changes. Once calibrated, the strain on the strain-gauge due to a change in displacement of the reservoir indicates the volume of drug within the reservoir.

It is therefore an object of the invention to provide a means for determining, in real time, the amount of drug remaining in the bellows type drug reservoir.

It is another object of the invention to provide a means for determining the amount of drug remaining in a reservoir without requiring the drug to be removed from the reservoir.

It is a further object of the invention to provide a means for determining the amount of drug remaining in a drug reservoir without contacting or otherwise interfering with the drug in the drug reservoir.

It is a further object of the invention to provide a means for determining the amount of drug remaining in a drug reservoir that replaces or supplements the means for determining the amount of drug remaining in a drug reservoir from the operation of the pumping or metering means of the pump.

These and other objects of the invention will be clear from the description of the invention contained herein and in particular with reference to the attached drawings wherein like elements are referenced by like reference numbers.

BRIEF DESCRIPTION OF THE DRAWINGS

FIG. 9 is a cross-sectional view of the drug reservoir of FIGS. 1 and 2 with another embodiment of the present invention added.

DETAILED DESCRIPTION OF THE INVENTION

Figure 1:
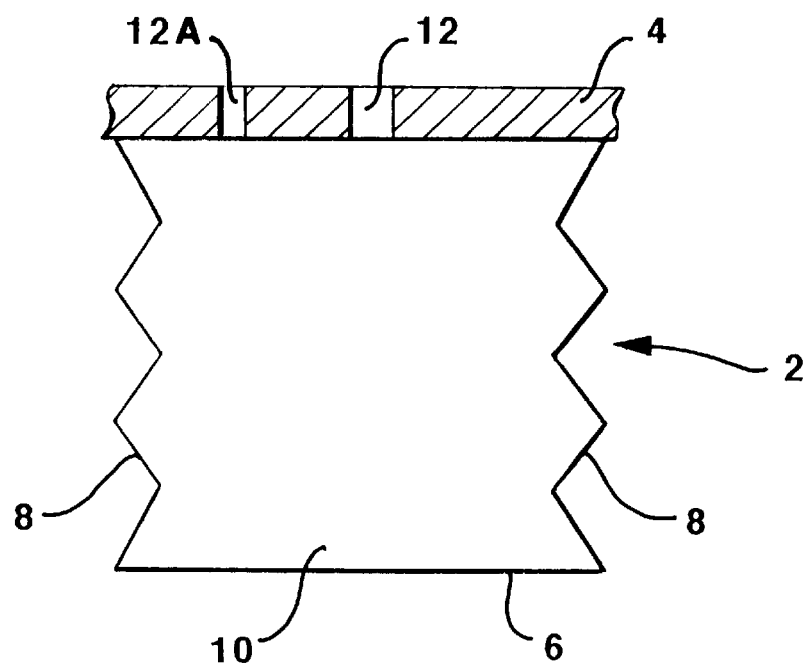
FIG. 1 is a cross-sectional view of a typical bellows-type drug reservoir.
Figure 2:
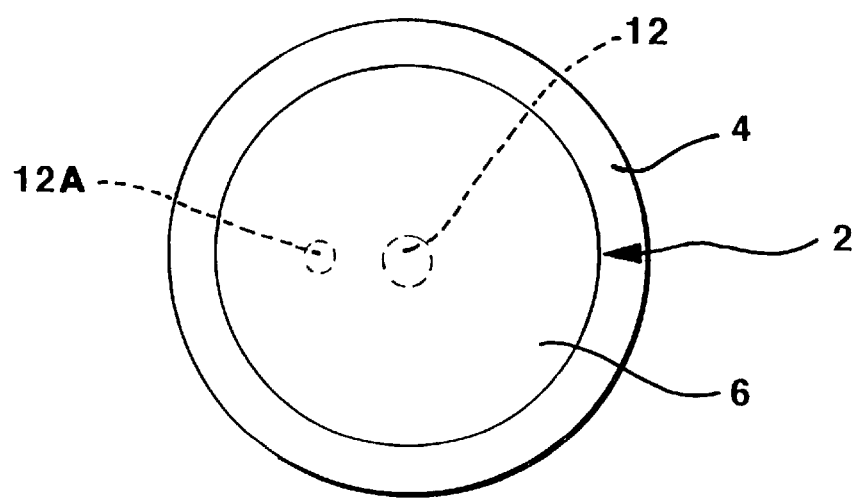
FIG. 2 is a top view of the reservoir of FIG. 1.
Figure 5:
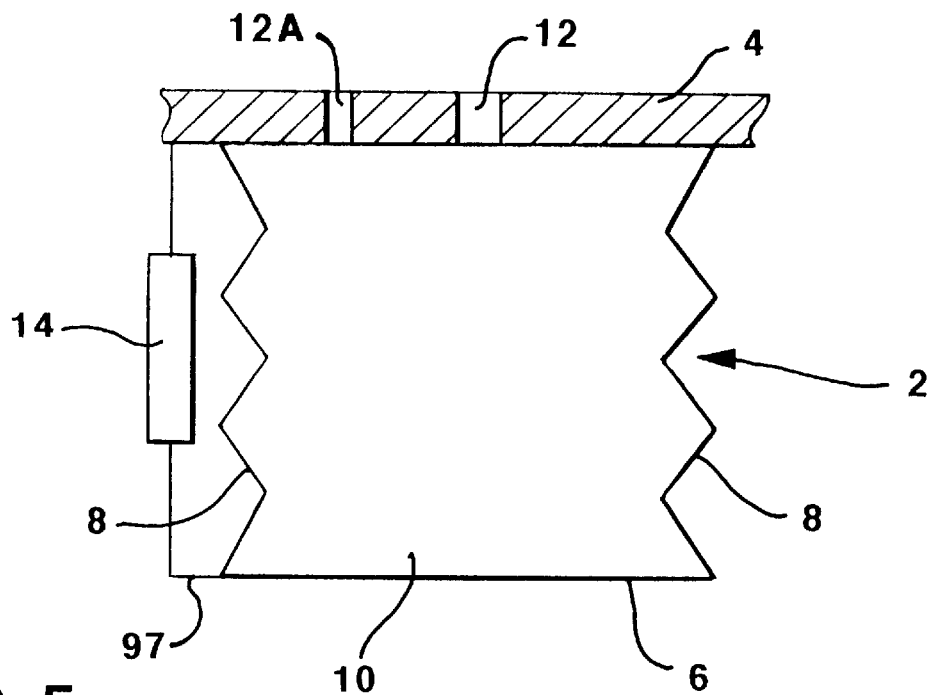
FIG. 5 is a cross-sectional view of the drug reservoir of FIGS. 1 and 2 with one embodiment of the present invention added.
Figure 6:
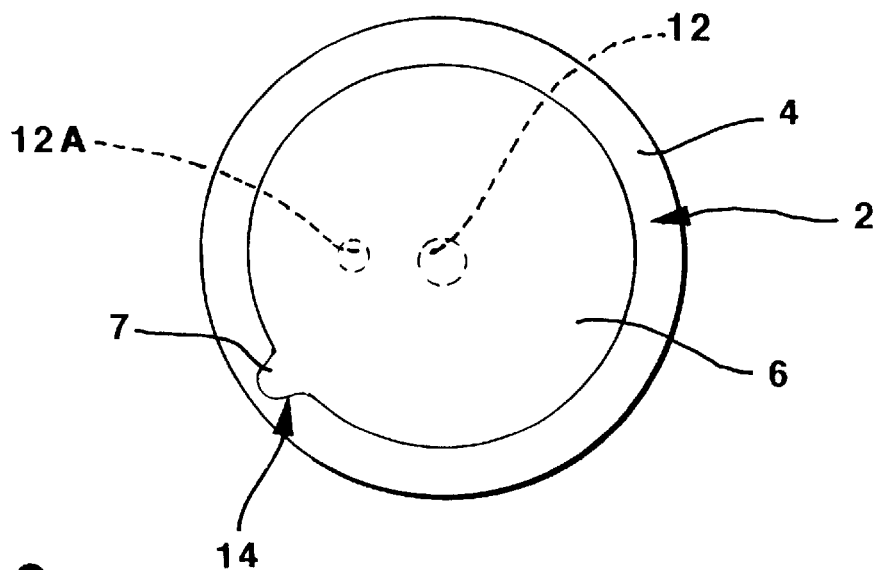
FIG. 6 is a top view of the drug reservoir of FIGS. 1 and 2 with the embodiment of the present invention shown in FIG. 5 added.

FIG. 5 shows the reservoir 2 of FIGS. 1 and 2 modified according to the present invention. A strain gauge 14 is placed between bulk head 4 and an end plate extension 7 that protrudes from the edge of end plate 6. End plate extension 7 allows strain gauge 14 to be offset from the edge of reservoir 2. In this position, as the distance X between bulk head 4 and end plate 6 increases in response to an increasing amount of drug entering space 10, the strain on strain gauge 14 increases. Conversely, as the distance X decreases as a result of drug exiting space 10, the strain on strain gauge 14 decreases. An example of a strain gauge 14 that may be used is the Mecanex Force Sensor Chip no. 00.59 manufactured by Mecanex S.A. of Nyon, Switzerland.

Figure 3:
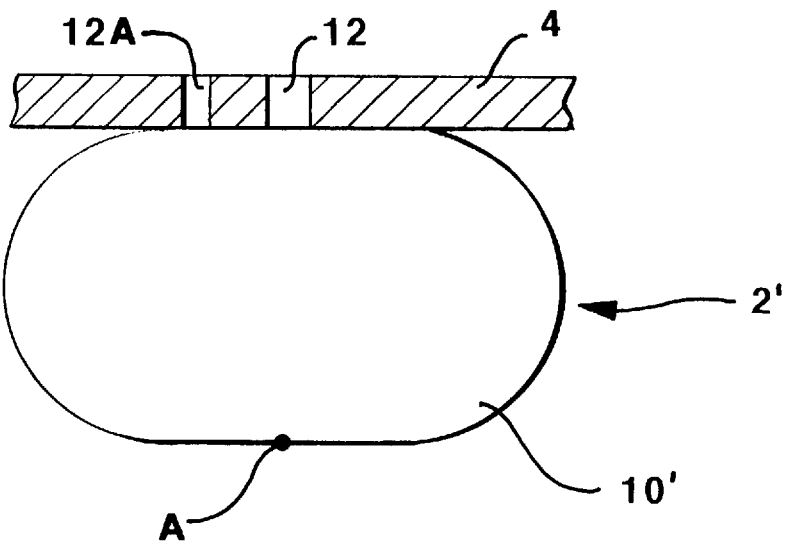
FIG. 3 is a cross-sectional view of an alternate type drug reservoir.
Figure 4:
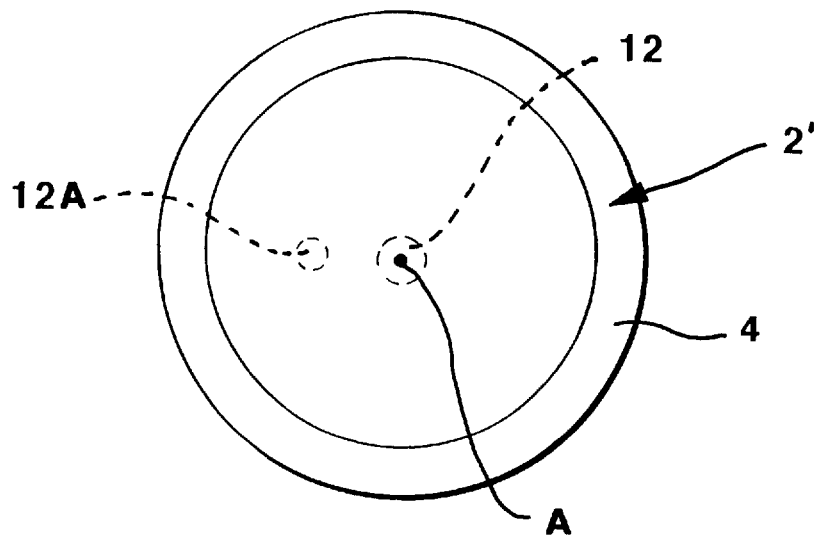
FIG. 4 is a top view of the reservoir of FIG. 3.
Figure 7:
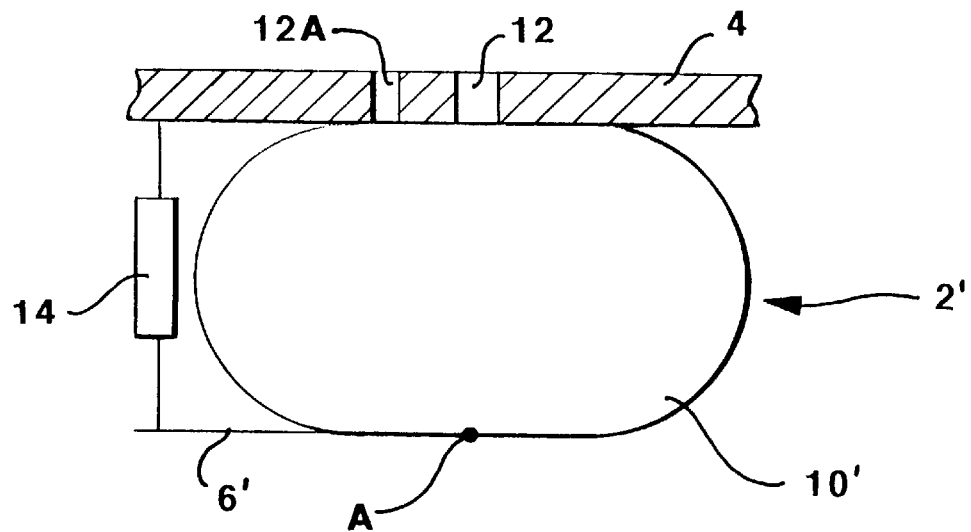
FIG. 7 is a cross-sectional view of the drug reservoir of FIGS. 3 and 4 with one embodiment of the present invention added.
Figure 8:
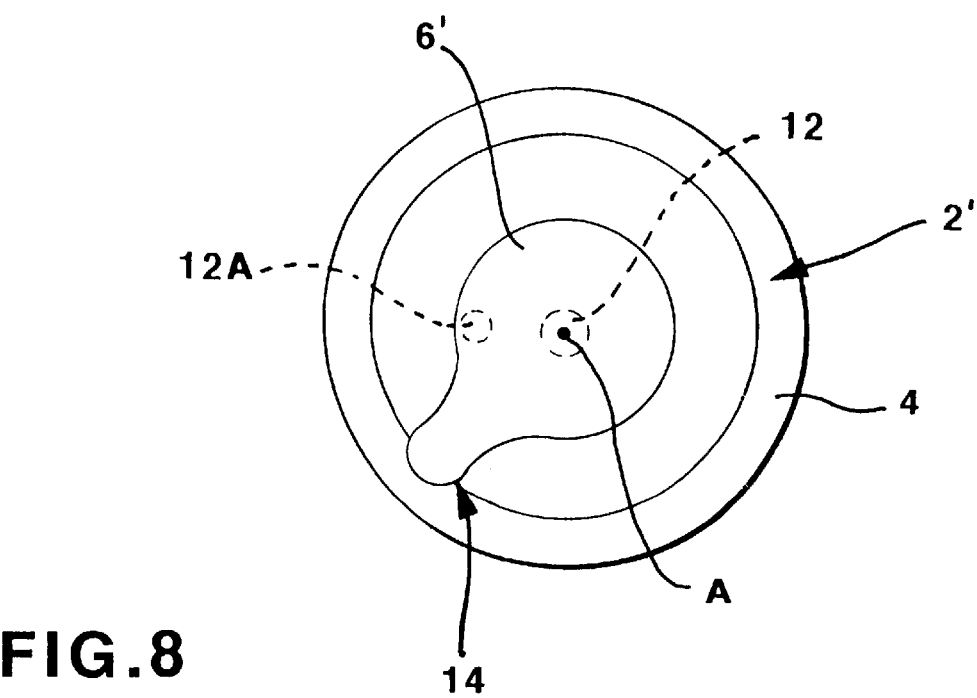
FIG. 8 is a top view of the drug reservoir of FIGS. 3 and 4 with the embodiment of the present invention shown in FIG. 7 added.

FIG. 7 shows the reservoir 2' of FIGS. 3 and 4 modified according to the present invention. An end plate 6' is attached to the outer surface of reservoir 2' at point A. End plate 6' extends in at least one direction for a distance sufficient such that a strain gauge 14 may be attached between end plate 6' and bulk head 4. As can be seen in FIG. 8, strain gauge 14 may be attached to an end plate extension 7' that is part of end plate 6' and extends beyond the outer edge of reservoir 2'.

As is the case with the bellows type reservoir 2, as the distance X' between bulk head 4 and end plate 6' increases in response to an increasing amount of drug entering space 10' within reservoir 2', the strain on strain gauge 14 increases. Conversely, as the distance X' decreases as a result of drug exiting space 10', the strain on strain gauge 14 decreases.

Figure 9:
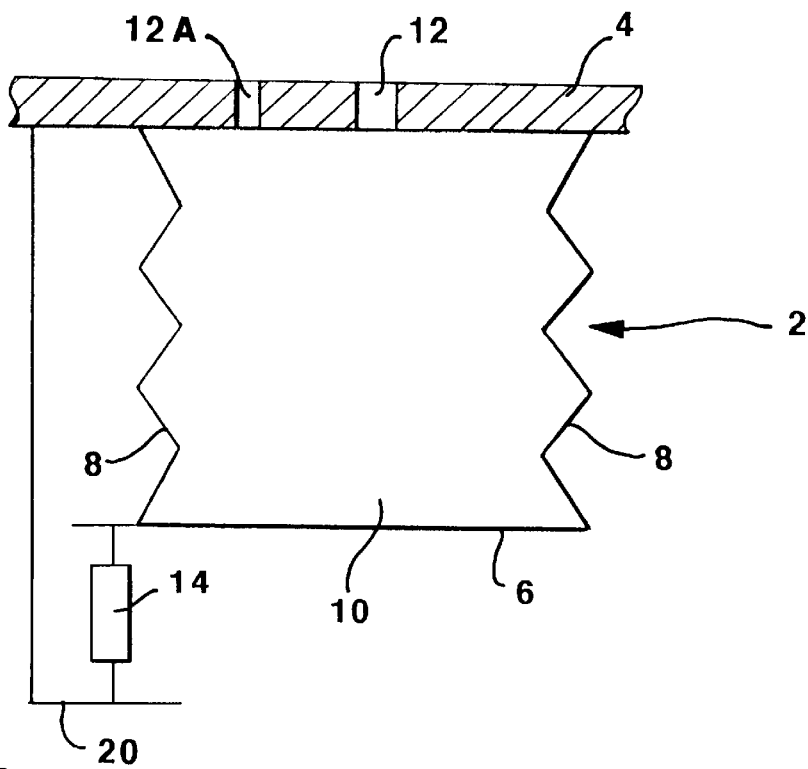
FIG. 9 is a cross-sectional view of the drug reservoir of FIG. 1 with another embodiment of the present invention added.

In an alternate embodiment shown in FIG. 9, the reservoir 2 of FIGS. 1 and 3 is modified by the present invention so that strain gauge 14 extends between end plate 6 and an anchor point 20. Anchor point 20 maintains a fixed distance from bulk head 4. In this embodiment, as drug enters reservoir 2, end plate 6 moves away from bulk head 4 and strain gauge 14 is "compressed." Conversely, as drug exits reservoir 2, end plate 6 moves toward bulk head 4 and strain gauge is "stretched." Anchor point 20 may be a point on the casing that surrounds reservoir 2 or may be a bracket attached to bulk head 4.

Figure 10:
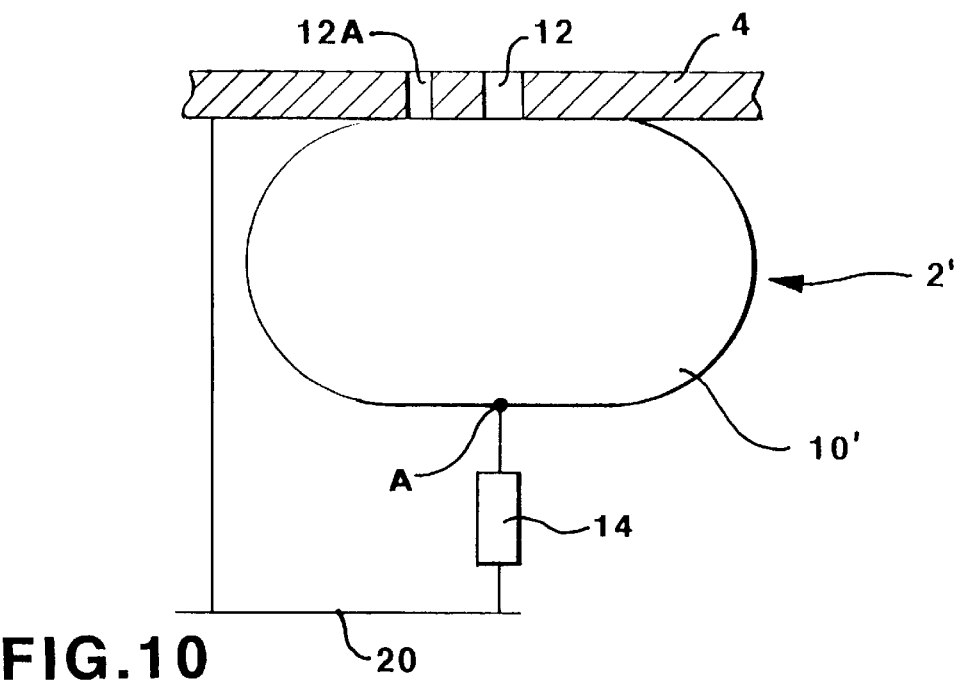
FIG. 10 is a cross-sectional view of the drug reservoir of FIGS. 3 and 4 with another embodiment of the present invention added.

In an alternate embodiment shown in FIG. 10, the reservoir 2' of FIGS. 3 and 4 is modified by the present invention so that strain gauge 14 extends between end plate 6' and an anchor point 20. As above, anchor point 20 maintains a fixed distance from bulk head 4. In this embodiment, as drug enters reservoir 2', end plate 6' moves away from bulk head 4 and strain gauge 14 is "compressed." Conversely, as drug exits reservoir 2', end plate 6' moves toward bulk head 4 and strain gauge is "stretched." Anchor point 20 may be a point on the casing that surrounds reservoir 2' or may be a bracket attached to bulk head 4.

Figure 11:
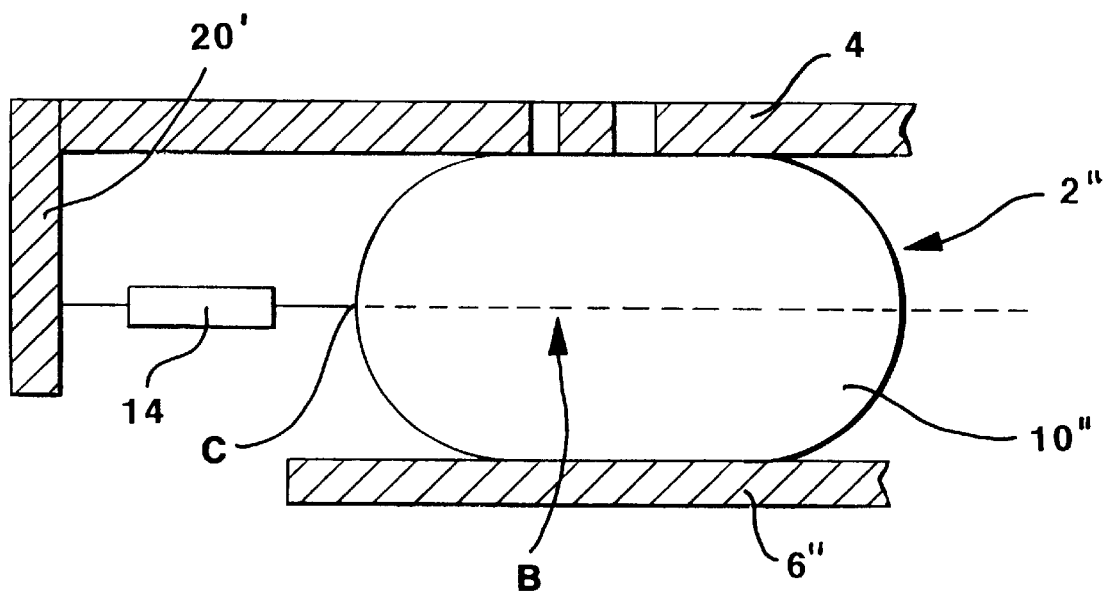
FIG. 11 is a cross-sectional view of an additional embodiment of the invention.

FIG. 11 shows an additional embodiment of the invention. In this embodiment, a bladder type reservoir 2" is attached to a bulk head 4 and an opposed end plate 6". End plate 6" is maintained at a fixed distance from bulk head 4 and is generally parallel to bulk head 4. In this embodiment, since reservoir 2" is attached to both bulk head 4 and end plate 6", as drug is added to the reservoir 2", reservoir 2" can only expand along an axis labeled "B" that is generally parallel to both the bulk head 4 and the end plate 6".

A strain gauge 14 is connected on one end to a point C on the surface of reservoir 2" where the axis "B" intersects the surface of reservoir 2". The other end of strain gauge 14 is connected to an anchor 20' that is fixed with respect to the bulk head 4 and end plate 6". In this way, as drug enters or leaves reservoir 2", point C moves along axis "B" and "compresses" or "stretches" strain gauge 14.

Figure 12:
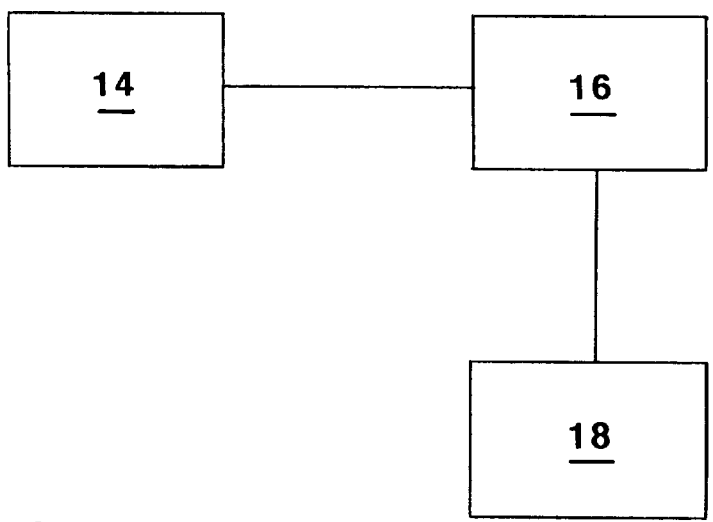
FIG. 12 is a schematic diagram of the invention.

FIG. 12 shows a schematic block diagram of the invention. Strain gauge 14 is connected to an electronics module 16 for processing signals sent from strain gauge 14. Module 16 is preferably a microprocessor capable of interpreting the signal sent from strain gauge 14 and calculating the volume of reservoir 2 or 2'. In the preferred embodiment, module 16 includes a "look up" table in memory having values of the strain on the strain gauge 14 reported to module 16 and corresponding volume values. These corresponding volume values have been determined by experimentation involving known volumes for reservoir 2 or 2' and the corresponding strain on strain gauge 14.

In an alternate embodiment, the volume in reservoir 2 or 2' can be determined by solving the following equation:

$$\text{volume} = S \times F$$

where S is the strain on strain gauge 14 reported to module 16 and F is a factor that represents the relationship between the strain on strain gauge 14 and the volume in reservoir 2 or 2'. F may be either a constant or a function depending on the linear characteristics of both the strain gauge 14 and the reservoir 2 or 2'.

Alternately, module 16 may be an amplifier such as an op-amp or transistor amplifier which may also be connected to a Schmitt trigger calibrated to the empty and full volumes of reservoirs 2 and 2'.

A communications module 18 is attached to module 16. Communication module 18 communicates the state of reservoir 2 as determined by module 16. The state of reservoir 2 communicated may be the actual volume of reservoir 2 or 2' or may be that the reservoir 2 or 2' is either empty or full. Communication module 18 may be an alarm such as an audible alarm that is activated when a predetermined condition of reservoirs 2 or 2' is achieved such as the reservoirs being either empty or full or when the reservoir is nearing an empty state. Communication module 18 may also include a video, liquid crystal display (LCD) or other video display as is well understood in the art that displays the current volume of drug in reservoirs 2 or 2'. Communication module 18 may also include a telemetry link to an external receiver that is in turn connected to a device for indicating the status of reservoir 2 or 2' as described above.

The invention has been described here in connection with a specific embodiment. It is to be understood, however, that the description contained herein is for the purpose of illustration only and is not intended to be limiting. For example, changes in modifications will occur to the description contained herein to those skilled in the art. The invention is to be interpreted in connection with the attached claims.

I claim:

1. In an implanted medical device for delivering fluids to a patient, the implanted medical device having a reservoir for storing fluids to be delivered to the patient and a bulk head, the reservoir attached to the bulk head wherein at least a point on the reservoir moves away from the bulk head as the reservoir increases in volume and moves toward the bulk head as the reservoir decreases in volume, a device for indicating the volume status of the reservoir comprising:

a strain gauge;

means for connecting the strain gauge to the bulk head and to a point opposite the bulk head that moves in response to movement of the reservoir;

means, connected to the strain gauge, for determining the volume of the reservoir by the strain on the strain gauge.

2. The device of claim 1 further comprising means, responsive to the means for determining the volume of the reservoir, for communicating the volume of the reservoir.

3. The device of claim 2 wherein the means for communicating comprises an alarm.

4. The device of claim 2 wherein the means for communicating comprises a telemetry link.

5. The device of claim 1 wherein the means for connecting comprises an end plate attached to the reservoir opposite the bulk head.

6. The device of claim 1 wherein the means for determining comprises a microprocessor.

7. The device of claim 6 wherein the microprocessor also includes a "look up" table.

8. In an implanted medical device for delivering fluids to a patient, the implanted medical device having a reservoir for storing fluids to be delivered to the patient and a bulk head, the reservoir attached to a bulk head wherein at least a point on the reservoir moves away from the bulk head as the reservoir increases in volume and moves toward the bulk head as the reservoir decreases in volume, a device for indicating the volume status of the reservoir comprising:

a strain gauge;

an anchor point located at a fixed distance from the bulk head;

means for connecting the strain gauge to the anchor point and to a point on the reservoir that moves as the reservoir moves toward or away from the bulk head;

means, connected to the strain gauge, for determining the volume of the reservoir by the strain on the strain gauge.

9. The device of claim 8 further comprising means, responsive to the means for determining the volume of the reservoir, for communicating the volume of the reservoir.

10. The device of claim 9 wherein the means for communicating comprises an alarm.

11. The device of claim 9 wherein the means for communicating comprises a telemetry link.

12. The device of claim 8 wherein the means for connecting comprises an end plate attached to the reservoir opposite the bulk head.

13. The device of claim 8 wherein the means for determining comprises a microprocessor.

14. The device of claim 13 wherein the microprocessor also includes a "look up" table.

15. In an implanted medical device for delivering fluids to a patient, the implanted medical device having a bladder type reservoir for storing fluids to be delivered to the patient and a bulk head, the bladder type reservoir attached to both the bulk head and an end plate located substantially parallel to and a fixed distance from the bulk head, wherein a point on the reservoir moves between the planes containing the bulk head and the end plate along an axis that is generally parallel to the bulk head and end plate, the point moving as the reservoir increases or decreases in volume, a device for indicating the volume status of the reservoir comprising:

a strain gauge;

an anchor point located generally along the axis, the anchor point being fixed with respect to the bulk head and end plate;

means for connecting the strain gauge to the anchor point and to the point on the reservoir;

means, connected to the strain gauge, for determining the volume of the reservoir by the strain on the strain gauge.

16. The device of claim 15 further comprising means, responsive to the means for determining the volume of the reservoir, for communicating the volume of the reservoir.

17. The device of claim 16 wherein the means for communicating comprises an alarm.

18. The device of claim 16 wherein the means for communicating comprises a telemetry link.

19. The device of claim 15 wherein the means for connecting comprises an end plate attached to the reservoir opposite the bulk head.

20. The device of claim 15 wherein the means for determining comprises a microprocessor.

21. The device of claim 20 wherein the microprocessor also includes a "look up" table.

* * * * *